(No Model.)
J. J. HAHN.
THILL COUPLING.
No. 356,998. Patented Feb. 1, 1887.
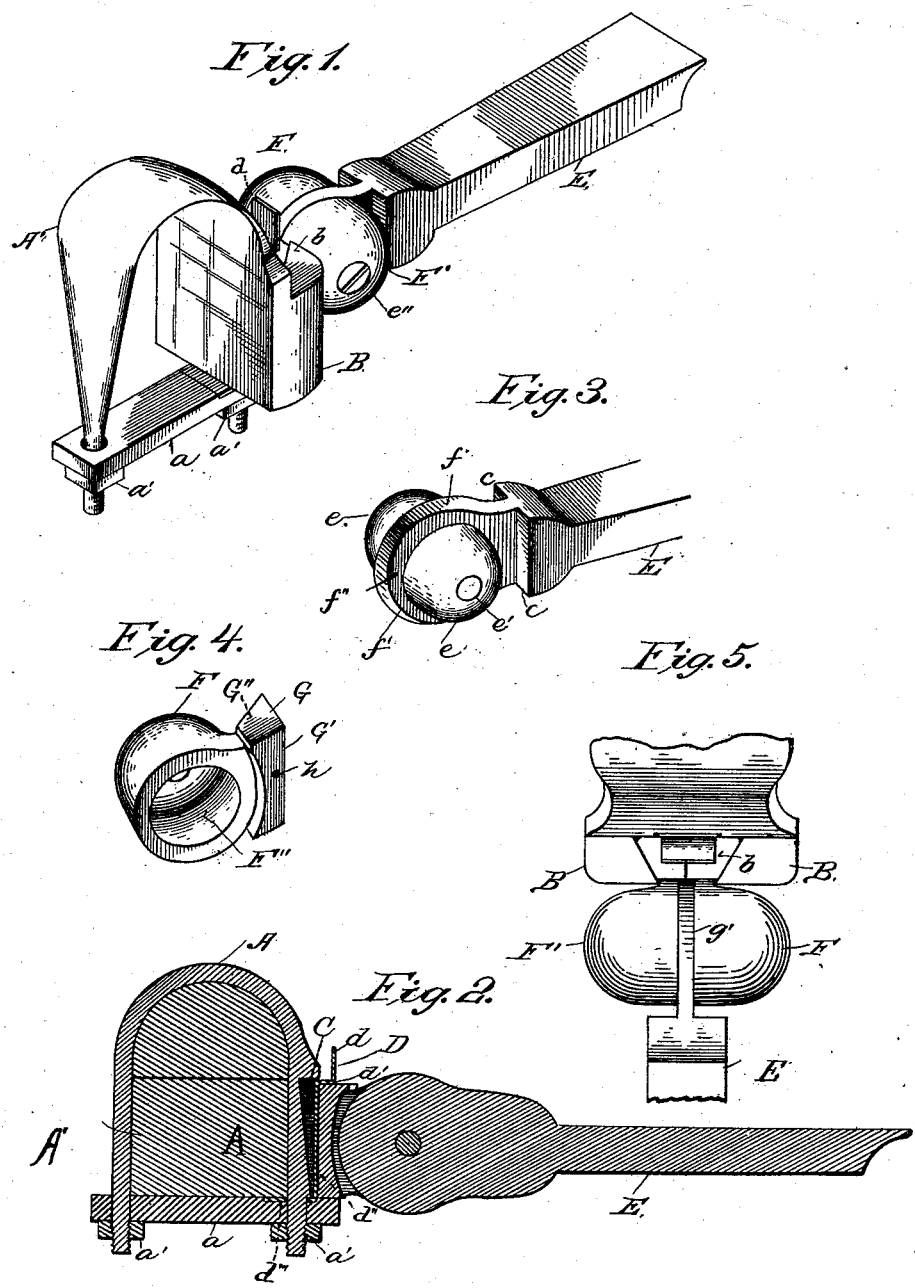
Witnesses
Harry S. Rohrer
F. R. Harding
Inventor
John J. Hahn
By his Attorney O. E. Duffy

UNITED STATES PATENT OFFICE.

JOHN J. HAHN, OF OXFORD, KANSAS.

THILL-COUPLING.

SPECIFICATION forming part of Letters Patent No. 356,998, dated February 1, 1887.

Application filed November 18, 1886. Serial No. 219,305. (No model.)

*To all whom it may concern:*

Be it known that I, JOHN J. HAHN, of Oxford, in the county of Sumner and State of Kansas, have invented certain new and useful Improvements in Thill-Couplings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to thill-couplings for wagons, carriages, and the like.
The object of this invention is to form a coupling that will be safe in operation, simple in construction, durable, and cheap in first cost.

The various parts of the coupling are interchangeable, so that when any portion is worn a new one may be substituted. The coupling may be made of any suitable metal, or out of the metal now used for ordinary thill-couplings.

Heretofore couplings were made in such manner that when they became worn they rattled, to prevent which rubber or other cushions were employed to prevent the noise, or when the bolt became worn and the bolt-hole larger there was a disagreeable noise, or when the nut came off the coupling came to pieces, thus frightening the horse and endangering the lives of the driver and passengers. To avoid these and other serious objections are further objects of my invention.
My invention consists in the combination of a ball-and-socket joint provided with tapering beveled projections that fit into an angular slot, which together form a dovetail joint, which projections are held in place by a suitable spring, the parts being arranged in such manner that they can neither accidentally come apart nor rattle. The socket-pieces are snugly fitted up against the collar formed on the eyepiece in such manner that no sand or grit gets into the joint, and thus wear is prevented. The bolt passing through them performs no other function than to prevent rattling should there be any. One of the sockets is provided with screw-threads and the other with a plain hole, preferably countersunk for the screwhead, and thus presents a nice smooth appearance; and it consists of other features, that will be hereinafter more fully described, and specifically pointed out in the claims.

I attain these objects by the mechanism illustrated in the accompanying drawings, in which—

Figure 1 is a perspective view of my improved thill-coupling. Fig. 2 is a longitudinal view thereof; and Figs. 3, 4, and 5 are veiws in detail.

Similar letters refer to similar parts throughout the several views.

A represents a sufficient portion of an axle to illustrate the application of my invention thereto.

A' is the thill-iron, made of any suitable metal, and is secured to the axle by the ordinary plate, a, and nuts a', the plate a, however, extending a little beyond the clip-iron, as clearly shown in Fig. 2, and the purpose of which will be seen hereinafter. The clip-iron A' has, preferably, formed integral therewith the two vertical beveled projections B B, and are so formed as to leave a mortise, b, having receding sides to form a dovetail, as shown in Figs. 1 and 5.

In the clip and between the vertical beveled portions B B is formed a groove, C, made deeper at its upper portion and gradually diminishing near its end, and which is adapted to receive a spring, D, firmly secured between the plate a and thill-iron A' by a nut, as clearly shown; and it consists of the thumb portion d, projecting portion d', and portions d'' d''', the purpose of which will be hereinafter more fully described.

E represents the shaft-iron, which is secured to the shaft by any well-known means and formed therewith, and at the end thereof is an enlarged portion, f', having the cheeks c c and the semi-spherical projections or balls e e, to form a bolt-bearing, and extending through which is a bolt or screw hole, e'. Between the outer circumference of the portion e e and the part f, I leave a rim or bearing portion, f''', adapted to fit in a recess, to be hereinafter described.

F F' are the sockets, formed of two separate parts, and are provided at their inner sides with the semi-spherical recesses F'' F'', which are adapted to fit snugly over and around the ball-bearing e e. On the outside of the sockets are the projecting parts G G, having the flat portions G' G' and the tapering beveled portions G'', the parts when brought together forming a dovetail portion adapted to slide into the mortise b, formed in the thill-iron, and the parts when so placed leave a recess, g', for the reception of the rim, above described. In one of the flat sides of the projection G is a hole, h, adapted to receive a pin secured in the opposite projection, the purpose of which is to more securely hold the parts together. I also form in the sockets holes for the reception of bolts or screws.

The operation of my device is as follows: The sockets are first placed over the ball-bearings, and are then secured by means of a screw or bolt. The dovetailed portions formed by the projections G G are then slipped into the mortise b until they rest upon the projecting portion of the plate a, and are then firmly secured by the spring D. It will thus be seen that by my invention the shafts can be connected to and disconnected from the thill-iron in a rapid, easy, and effective manner, and that when so secured the parts are prevented from rattling, and also, should the screw or bolt become broken or lost, the parts are still securely held together by means of the ball-and-socket joint, thereby preventing accident or injury.

A thill-coupling as above described is extremely simple in construction, may be manufactured at a slight cost, is effective in operation, and is strong and durable.

Having thus fully described my invention, what I claim, and desire to secure by Letters Patent of the United States, is—

1. The herein-described improved thill-coupling, the parts E and G', connected by a ball-and-socket joint, and dovetailed portions secured by a spring, substantially as shown and described.

2. In a thill-coupling, the clip provided with the projecting portions forming a mortise, sockets F F', having the projecting parts G G', adapted to slide in the mortise, and spring D, in combination with the shaft-iron provided with enlarged portions and ball-bearing portions e e, substantially as shown and specified.

3. A thill-coupling, the shaft-iron, and thill-clip connected by a ball-and-socket joint and dovetailed portions, the securing-spring D, and groove C, substantially as shown and described.

4. The herein-described improved thill-coupling connected to the shaft-iron by a dovetailed joint formed by the parts B B and G G, and secured by a spring, substantially as shown and described.

5. In a thill-coupling, clip-iron A', having projections B B to form a mortise, groove C, and spring D, in combination with shaft-iron E, the portions f, semi-spherical portions e e, sockets F F', provided with semi-spherical recesses F''' F'', projections G G, and screw e'', all substantially as shown, and for the purpose specified.

6. The combination, in a thill-coupling, of the socket-pieces provided with beveled projections and the ball-piece with the tapering dovetail slot, substantially as described.

7. In a thill-coupling, the combination of the clip provided with an angular tapering slot, with the tapering beveled pieces of the sockets, substantially as described.

8. In a thill-coupling, the combination of the clip having angular tapering slot, the eye-piece having ball-joints, and the connecting socket-pieces, substantially as described.

9. In a thill-coupling, the combination of the clip having angular tapering slot, the eye-piece having ball-joints, and the connecting socket-pieces provided with the tapering beveled projections, all arranged to operate as set forth.

In testimony that I claim the foregoing as my own I affix my signature in presence of two witnesses.

JOHN J. HAHN.

Witnesses:
 JULIUS SOLGER,
 C. M. WERLE.